United States Patent [19]

Ruedin

[11] 4,320,190

[45] Mar. 16, 1982

[54] METHOD OF MANUFACTURING THE SUBSTRATE OF AN ELECTROCHROMIC DISPLAY CELL

[75] Inventor: Yves Ruedin, Saint-Blaise, Switzerland

[73] Assignee: Ebauches S.A., Neuchâtel, Switzerland

[21] Appl. No.: 212,905

[22] Filed: Dec. 4, 1980

[30] Foreign Application Priority Data

Dec. 18, 1979 [CH] Switzerland ............... 11208/79

[51] Int. Cl.³ ..................... G03C 5/00; B44C 1/22
[52] U.S. Cl. .................... 430/296; 430/314; 430/319; 430/952; 156/654; 156/659.1
[58] Field of Search .......... 430/314, 319, 952, 962, 430/296; 156/654, 659.1, 661.1

[56] References Cited

U.S. PATENT DOCUMENTS

| | | | |
|---|---|---|---|
| 3,506,442 | 4/1970 | Kerwin | 430/952 X |
| 3,784,380 | 1/1974 | Compare | 430/952 X |
| 3,858,304 | 1/1975 | Leedy et al. | 430/314 X |
| 3,860,424 | 1/1975 | Johnson | 430/319 X |
| 4,040,891 | 8/1977 | Chang et al. | 156/659.1 X |

*Primary Examiner*—Roland E. Martin, Jr.
*Attorney, Agent, or Firm*—Silverman, Cass & Singer, Ltd.

[57] ABSTRACT

The invention provides a method of manufacturing the substrate of an electrochromic display cell as a result of which the ionic conductor of the cell cannot come into contact with the transparent conductive elements which form part of this substrate. A transparent conductive layer, a layer of an electrochromic material and a layer of photosensitive material having a positive action are deposited in turn on a transparent plate. A network of conductive elements is formed by etching away the electrochromic layer and the conductive layer through a mask constituted by the photosensitive material which is selectively exposed and developed. The electrochromic material is then etched away through a second mask formed by the same photosensitive material selectively exposed and developed a second time. This second mask is also used for the deposition of a layer of dielectric material. The conductive elements are thus covered with a continuous layer of dielectric material and of electrochromic material.

17 Claims, 9 Drawing Figures

METHOD OF MANUFACTURING THE SUBSTRATE OF AN ELECTROCHROMIC DISPLAY CELL

BACKGROUND OF THE INVENTION

1. Field of the Invention

This invention relates to a method of manufacturing the substrate of an electrochromic display cell from a transparent and insulating plate.

Due to their low power consumption, such cells are specially suitable for the display of numeric information or other forms of display in self-contained apparatus powered by primary batteries or accumulators of low capacity. Electronic watches are an example of such apparatus.

In these display cells, the optical properties of the electrochromic material deposited on the electrodes are modified by the action of electrical charges which are produced therein by an electric current which circulates between these electrodes and a counter-electrode through an ionic conductor. It is necessary to prevent any contact between the ionic conductor and the conductive electrodes, so as to preclude any electro-chemical reaction which could lead, for instance, to the dissolution of the electrodes and, consequently, to a much shortened duration of the working life of the cell.

2. Description of the Prior Art

The method usually used for the manufacture of these substrates cannot ensure that such a contact between the ionic conductor and the conductive electrodes does not occur. It consists of depositing a dielectric layer at the desired places through a first protective mask, then depositing a layer of electrochromic material through another mask which is complementary to the first one, that is to say permits the deposition of this electrochromic material at the places left free by the deposition of the dielectric material. There is a big risk, with this method, that the zones which are covered by the dielectric material and the zones covered by the electrochromic material are not exactly contiguous and, consequently, that the ionic conductor can come into contact with the electrodes or their connecting tracks.

Swiss Patent No. 564,227 suggests, but for solving another problem, the provision of a marginal overlap between the electrochromic material and the layer made of dielectric material by which it is surrounded. This arrangement obviously also enables any contact between the ionic conductor and the electrodes or the connecting tracks to be prevented. But, in this case, the coloration created in the zone of the electrochromic material in contact with the ionic conductor diffuses under the marginal protecting zone, and hence cannot later be erased, with the consequential drawback of creating a permanent colored edge at the places of the overlap.

SUMMARY OF THE INVENTION

The object of the present invention is to provide a method for manufacturing the substrate of an electrochromic cell on which the electrochromic material is so closely surrounded by the dielectric material that any contact between the ionic conductor and the electrodes or the conductive tracks connecting the electrodes with the terminal connections of the cell is rigorously prevented, without the above-mentioned drawback.

This object is achieved by providing a transparent isolating plate and by depositing successively on its whole surface a layer of transparent conductive material, a layer of electrochromic material and a layer of positive photosensitive material.

The photosensitive material is then exposed through an exposure mask the opaque portions of which are shaped to correspond to the desired electrodes, terminal connections and conductive tracks connecting the electrodes with the terminal connections.

After development, the electrochromic layer and the layer of conductive material are successively etched away through the apertures of the protective mask formed by the remaining photosensitive material.

After this etching, the remaining photosensitive material is exposed again through a second exposure mask the opaque portions of which are shaped to correspond to the display elements, that is to the shape of the zones which will be made of electrochromic material in the finished substrate.

After a second development, the electrochromic material is etched away through the second protective mask formed by the remaining photosensitive material.

A layer of a transparent dielectric material is then deposited on the whole surface of the substrate, with the exception of the zone of the terminal connections of the cell. This dielectric material is thus deposited partially on the second protective mask and partially on the plate itself at the places where the electrochromic material has been etched away during the first and the second etching.

Finally, the remaining photosensitive material is removed by dissolution in a suitable solvent. During this dissolution, the portions of the dielectric layer which had been deposited on this remaining photoresistive material are thus also removed.

Due to the fact that only one protective mask has been used to etch away the electrochromic material up to its final shape and to deposit the layer of dielectric material, the substrate is now covered by a continuous protective layer comprising zones of electrochromic material very closely surrounded by dielectric material. The electrodes and the conductive tracks are thus efficiently protected against the ionic conductor when the substrate is mounted in the finished display cell.

The various features of the invention will be apparent from the following description, drawing and claims, the scope of the invention not being limited to the drawing itself as the drawing is only for the purpose of illustrating a way in which the principles of the invention can be applied. Other embodiments of the invention utilising the same or equivalent principles may be used and structural changes may be made as desired by those skilled in the art without departing from the present invention and the purview of the appendant claims.

BRIEF DESCRIPTION OF THE DRAWING

The accompanying drawing shows, by way of example, one preferred embodiment of the invention. In the drawing.

Figure 1:
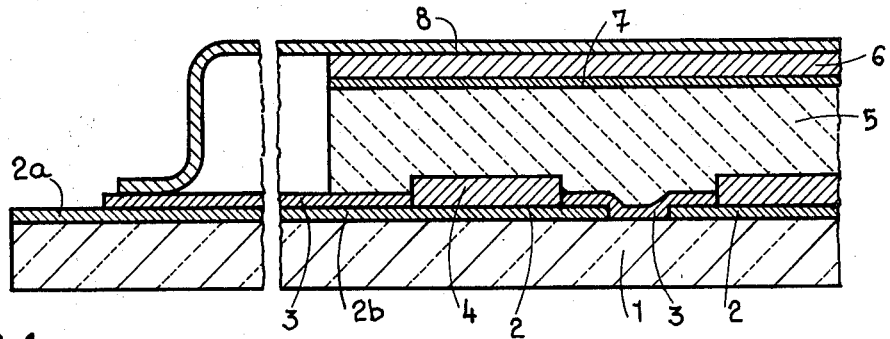
FIG. 1 is a fragmentary cross-sectional view of an electrochromic display cell.

The cell shown in FIG. 1 comprises a substrate made from a transparent and insulating plate 1, for example being made of glass, covered with a network of conductive elements, also transparent and comprising control electrodes 2, situated at the places of the patterns to be displayed and having dimensions slightly greater than those of these patterns, terminal connection contacts such as 2a, situated at the periphery of the substrate, and conductive tracks such as 2b interconnecting the electrodes to the terminal contacts. This network can be made, for instance, of tin oxide ($SnO_2$) doped with antimony.

The electrodes 2 as well as the tracks 2b are coated with a transparent dielectric layer 3, made for example of silicon oxide ($SiO_x$ where $1 < x \leq 2$), interrupted at the places corresponding to the patterns to be displayed as well as at the regions of the terminal connection contacts of the cell. At the places of the patterns to be displayed, the electrodes are covered with an electrochromic material 4 constituted by an oxide of a metal of transition, such as tungsten oxide ($WO_3$). The whole is covered by an ionic conductor 5 which can be constituted by dilute sulphuric acid or by an ionic conductive polymer containing the diffusing pigments which are necessary to give the background of the display the desired appearance, for example titanium oxide ($TiO_2$) for a white ground. A small plate of graphite 6, used as a current collector, is in electric contact with a counter-electrode 7, made of graphited paper, itself applied on the ionic conductor 5. A cover 8 made of metallized glass, of passivated metal or other suitable material and secured at its periphery to the substrate 1, holds the whole assembly together and ensures the electrical connection of the counter-electrode 7 with the outside of the cell.

The manufacture of the substrate of this cell is effected as follows:

The transparent and insulating plate 1, made of glass for instance, is first entirely covered with a conductive layer 12 which is also transparent. This conductive layer 12 can be constituted by tin oxide ($SnO_2$) doped with antimony or by indium oxide ($In_2O_3$) doped with tin and can be deposited by a method of chemical vapour deposition (CVD), by pyrolysis, by sputtering or by any other suitable method (FIG. 2).

A layer of electrochromic material 4 constituted by an oxide of metal of transition, for instance by tungsten oxide ($WO_3$), is then deposited on the whole surface of the conductive layer 12 (FIG. 2), by vacuum evaporation or by sputtering.

Figure 2:
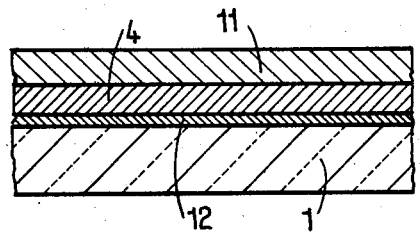
FIGS. 2 to 9 are fragmentary sectional views of the substrate of this cell illustrated at different stages of its manufacture.

Positive photosensitive material 11 (positive photoresist), constituted for example by one of the products sold under the tradenames AZ 1370 and AZ 1350 (Registered Trademarks of Shipley Corporation, in the United States), is then deposited on the whole surface of the electrochromic material 4 by pulverisation, spinning, dipping or other suitable means (FIG. 2).

Figure 3:
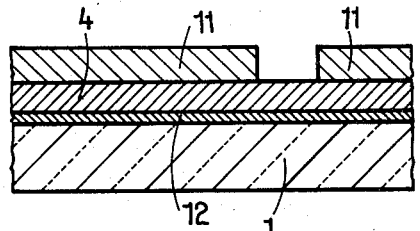

This layer of photosensible material 11 is then selectively exposed to light, through an exposure mask the opaque portions of which are shaped to correspond to the network of electrodes, to the conductive tracks and to the terminal contacts. The image obtained is developed according to the techniques which are well known in photolithography in order to eliminate the exposed portions of the photosensitive layer 11. The non-exposed portions of this photosensitive layer 11 thus constitute a protective mask for the electrochromic material which they cover (FIG. 3).

Figure 4:
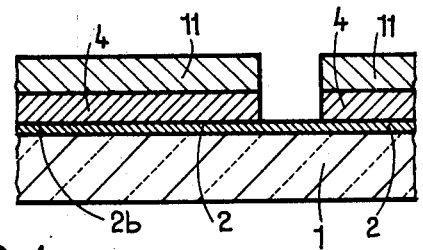

The electrochromic layer 4 is then etched away, through this protective mask, for example in an alkaline solution such as an ammonia solution ($NH_4OH$), and it is eliminated wherever it is not protected by this mask (FIG. 4).

It should be noted that if a photosensitive material is used, the developer of which is alkaline, such as the AZ 1370 or the AZ 1350 materials previously mentioned, this developer can also be used for the etching of the electrochromic layer. This presents the advantage of simplifying the manufacture of the substrate while reducing the number of manufacturing steps.

It is also possible, instead of using a chemical etching process in the liquid phase, to use a technique of ionic etching. In any case, attention must be paid to the fact that the etching means must be such that it does not impair substantially the properties of the non-exposed photosensitive material which serves as a protective mask during the etching procedure.

Figure 5:
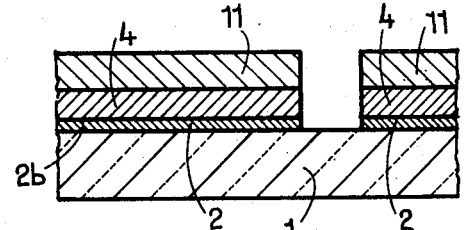

The layer 12 of conductive material is then etched away through this same protective mask, at the places where the electrochromic material 4 has been removed, so as to produce the network of electrodes 2, of conductive tracks 2b and of terminal contacts 2a (FIG. 5). This etching can be achieved by a chemical process in the liquid phase using a mixture of hydrochloric acid and of zinc powder, by means of a plasma or by an ionic engraving technique. Again, it is necessary to pay attention to ensuring that the etching means used does not substantially impair the properties of the photosensitive material which is still present.

Figure 6:
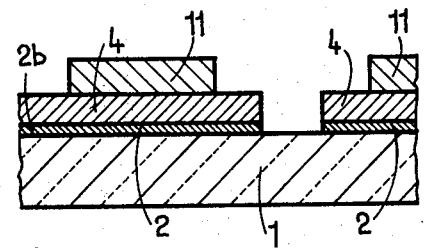

The remaining layer of photosensitive material 11 is then exposed to light for a second time, through a second exposure mask the opaque portions of which present the shape of the display elements, that is the shape of the zones which will be made of electrochromic material in the final substrate. The latent image as obtained is developed, employing again techniques which are well known in photolithography, to eliminate the exposed portions of the remainder of the photosensitive layer 11. The non-exposed portions of this layer thus provide a new protective mask for the electrochromic material they cover (FIG. 6).

Figure 7:
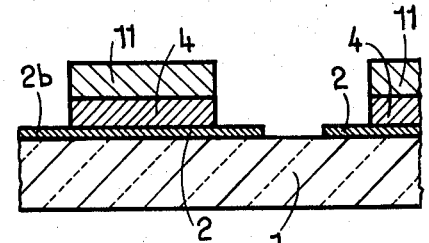

The electrochromic layer 4 is then etched away through this new protective mask, by the same means as those which were used during the first etching described above (FIG. 7).

Figure 8:
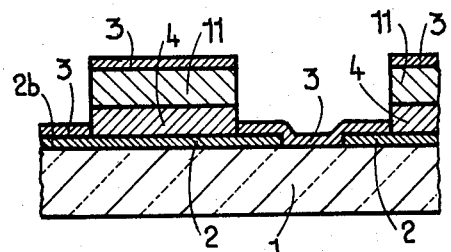

A layer of transparent dielectric material 3 which can be constituted by silicon oxide ($SiO_x$ where $1 < x \leq 2$), is then deposited over the whole surface of the substrate (FIG. 8) with the exception of the regions of the terminal contacts of the cell which are covered during this deposition by a suitable mask, of mechanical or other form, the dimensions and positioning of which are not critical. This deposition is effected, for instance, by sputtering or by vacuum evaporation.

Consequently, the dielectric material is deposited all around the remaining electrochromic material, through the protective mask constituted by the photosensitive material 11 which has been used for the second etching of this electrochromic material. Obviously, it is deposited also on the mask itself.

This protective mask is then eliminated, by dissolution of the photosensitive material 11 in a suitable solution which does not attack the electrochromic material 4, such as a ketonated solvent in the case where the electrochromic material is tungsten oxide ($WO_3$).

Figure 9:
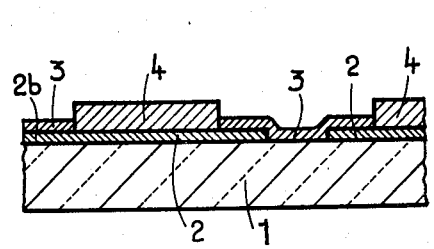

The portion of the dielectric layer 3 which is carried by the photosensitive material 11 is simultaneously carried away and eliminated with the latter, and the substrate receives its final appearance, such as shown in FIG. 9.

It is advantageous to agitate the solvent during this dissolution, ultrasonically for example, in order to break up the dielectric material deposited on the photosensitive material and improve the elimination thereof. It should be noted that the dielectric material deposited on the rest of the substrate adheres very strongly to the latter so that it is not at risk of being removed by the agitation of the solvent. This also applies to the electrochromic material which adheres very strongly to the electrodes 2.

It should be noted that the photosensitive material 11 could be replaced by a material sensitive to another form of radiation, for instance to electronic radiation (electronresist), in which case the two exposures to light would be replaced by exposures to the appropriate radiation, for instance a beam of electrons. In any case, the use of a sensitive material having a positive action, which consequently can be exposed and developed a second time at the places which have not been exposed during the first exposure constitutes an important simplification of the method of manufacturing the substrate. Moreover, the use of the same protective mask, constituted by the sensitive material remaining after the second exposure and the second development, for the two etching operations of the electrochromic layer 4 and the deposition of the dielectric layer 3 constitutes a main feature of the invention. As a matter of fact, it guarantees the complete coating of the electrodes 2 and of the connecting tracks 2b either by the insulating layer 3 or by the electrochromic material 4, without interruption between the zones covered by one or the other material, whereas the tolerances for manufacturing and positioning the masks used in the known methods do not enable to avoid spaces of several microns remaining between these zones. Hence, with the present invention, the electrodes 2 and the tracks 2b are completely protected, when the substrate is mounted in the finished display cell, against the ionic conductor 5 with which they have no contact, so that they do not have to withstand any attack therefrom. The length of the working life of the cell is consequently very greatly increased with respect to that of a cell the substrate of which is manufactured by known methods.

Finally, it should be noted that the method of manufacture of a substrate providing these advantages is simpler than the methods of fabrication previously known and that it is particularly well suited to mass production applications.

I claim:

1. Method of manufacturing the substrate of an electrochromic display cell comprising the steps of providing a transparent and insulating plate; depositing successively, on the whole surface of the said plate, a layer of a transparent conductive material, a layer of an electrochromic material and a layer of a material which is positively sensitive to a radiation; exposing selectively to the said radiation a portion of the said sensitive layer; selectively eliminating the said exposed portion; etching successively the said electrochromic layer and the said conductive layer at the places exposed by said selective elimination so as to form, with the rest of the said conductive layer, a network of transparent conductive elements constituted by control electrodes situated at the places of the patterns to be displayed, terminal connection contacts of the cell and tracks connecting the said electrodes to the said contacts; exposing the remainder of the said sensitive layer, except at places corresponding to the said patterns to be displayed, and selectively eliminating the exposed portions of the said remainder of the sensitive layer; etching selectively the remainder of the electrochromic layer at the places exposed by this latter selective elimination; depositing a layer of a transparent dielectric material on the whole surface of the said substrate, except in the regions of the said contacts; and eliminating successively the remainder of the said sensitive layer with simultaneous elimination of the dielectric material carried thereby, the substrate being thus covered by a layer comprising zones of dielectric material and zones of electrochromic material, without any free space between these zones.

2. Method according to claim 1, wherein said conductive layer is deposited by sputtering.

3. Method according to claim 1, wherein said conductive layer is deposited by pyrolysis.

4. Method according to claim 1, wherein said conductive layer is deposited by a method of chemical vapour deposition.

5. Method according to claim 1, wherein said electrochromic layer is deposited by vacuum evaporation.

6. Method according to claim 1, wherein said electrochromic layer is deposited by sputtering.

7. Method according to claim 1, wherein said sensitive material is a positively photosensitive material.

8. Method according to claim 1, wherein said sensitive material is a positively electronsensitive material.

9. Method according to claim 1, wherein said electrochromic layer is etched by an alkaline solution.

10. Method according to claim 9, wherein said alkaline solution is constituted by the developer used for development of said exposed sensitive material.

11. Method according to claim 1, wherein said electrochromic layer is etched by using an ionic etching technique.

12. Method according to claim 1, wherein said conductive layer is etched by using a chemical method in liquid phase.

13. Method according to claim 1, wherein said conductive layer is etched by a plasma.

14. Method according to claim 1, wherein said conductive layer is etched by using an ionic etching technique.

15. Method according to claim 1, wherein said dielectric layer is deposited by vacuum evaporation.

16. Method according to claim 1, wherein said dielectric layer is deposited by sputtering.

17. Method according to claim 1, wherein said remainder of the sensitive material is eliminated by dissolution thereof in a solvent which is inactive with respect to the other constituents of the substrate, the said solvent being agitated for breaking up and removing the dielectric material carried by said sensitive material.

* * * * *